J. LACEY.
Wheel-Cultivator.
No. 53,837.
Patented Apr. 10. 1866.
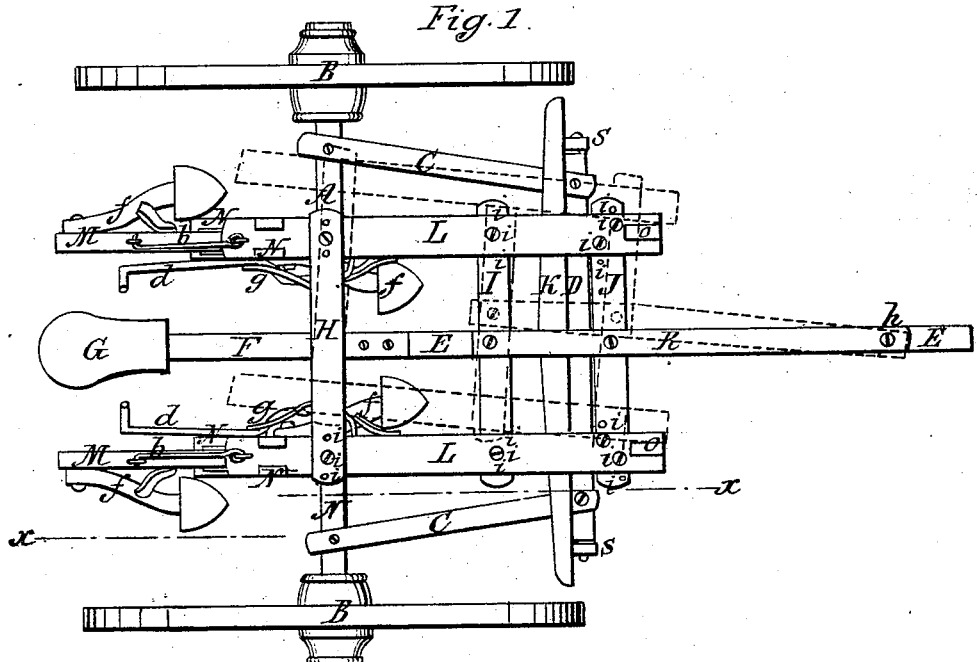
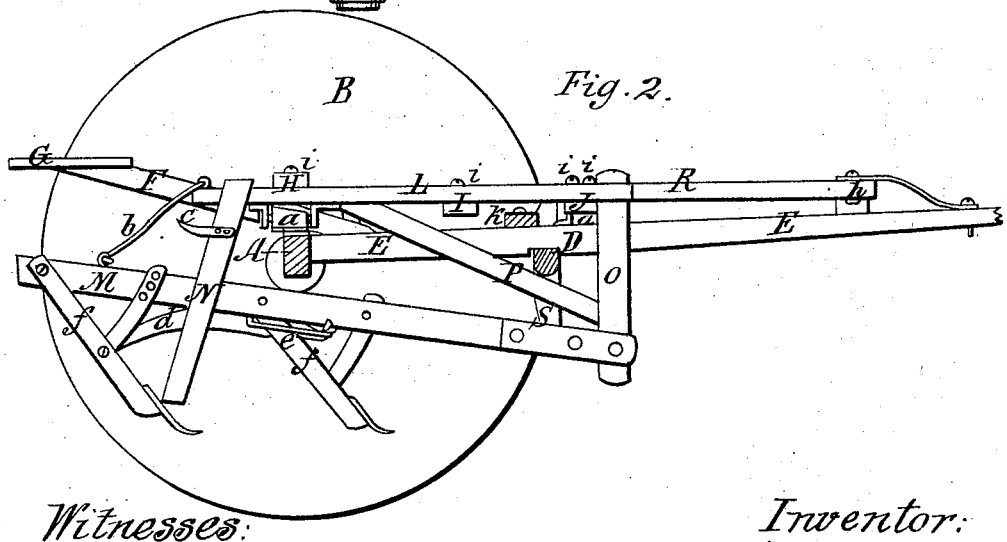
Witnesses:
L. L. Bond
E. A. West
Inventor:
John Lacey

UNITED STATES PATENT OFFICE.

JOHN LACEY, OF CHICAGO, ILLINOIS.

IMPROVEMENT IN CULTIVATORS.

Specification forming part of Letters Patent No. 53,837, dated April 10, 1866.

*To all whom it may concern:*

Be it known that I, JOHN LACEY, of the city of Chicago, county of Cook, and State of Illinois, have invented certain new and useful Improvements in Cultivators; and I hereby declare that the following is a full, clear, and exact description of the same, reference being had to the accompanying drawings, in which—

Figure 1 is a top view, and Fig. 2 a vertical section.

Like letters refer to similar parts in both figures.

The nature of my invention consists in providing bevel-rollers under the movable parts of the upper frame-work of a cultivator and between it and axle, so as to preserve the line of movement and prevent friction; in pivoting the movable parts to the draft-pole forward of its attachment to the fixed parts; and in the new combination of the several parts, as hereinafter claimed.

To enable others skilled in the art to make and use my invention, I will proceed to describe its construction and operation.

My cultivator belongs to the class usually denominated "straddle-row"—that is, one where the row of corn or other plant passes under the cultivator.

The axle A is made about four feet in length and of any desired size. The wheels B are similar to any ordinary carriage-wheels. At each end of the axle A, near the hubs of the wheels, I attach the bars C, which are bolted on. These bars are about three and one-half feet in length and extend forward to the cross-bar D. The front ends are brought toward each other at an angle of about fifteen degrees, as shown in Fig. 1, so as to brace against each other. The cross-bar D is firmly attached to the draft-pole E at the under side, and extends a few inches beyond the brace-bars C, which are bolted to it, and at their ends swinging pendants S are attached, to which pendants the whiffletrees are attached by means of proper hooks or other device. The pendants S, at their upper ends, rest against the front of the double-tree K. The draft-pole E is firmly attached to the axle at the middle and to the cross-bar D. These parts of themselves constitute a frame which is stationary, except as it is drawn over the ground, and I call them the "fixed parts." Over this frame-work, with some of its parts extending below, I attach a movable frame, and designate its parts as "movable" ones. The movable frame consists of the beams L L, H, I, and J, and is about three and two-thirds feet in length and two and one-third feet in width. It is adjustable in width by means of the bolts and holes *i i*. To the front end of the beams L L, I attach pendants O, which are supported by the brace P. At the lower end of these pendants I attach the plow-beams M by a hinge or joint. These plow-beams M are about six and one-half feet in length and extend back, passing through the stirrups N. On the outside, near the rear end, and on the inside, just forward of the stirrup, the plows *f* are fastened, in the ordinary manner, by a bolt and adjustable brace. These beams can be raised up when it is desired to move the cultivator, and held up by the hooks *b*, which are fastened to the rear end of the beams L and hooked into a staple on the top of the beams M. The stirrups N are made about the same length as the pendant O, and are long enough to allow the plow-beams full play. On the inside of these stirrups I pivot the foot-levers or treadles *d*. The rear end of these treadles is turned inward, so as to make them convenient for the foot, and at the front end they are turned outward, the turned point passing under the plow-beams their entire width, and are prevented from being displaced by the wide staples or rods *e*, Fig. 2. On the outside of these stirrups I place foot-rests *c*, which are made of iron or wood, as may be desired. The stirrups are braced, by means of the braces *g*, to the cross-bar H. These parts constitute the movable frame-work, and are attached to the fixed frame-work at the front end by means of the bar R, which is bolted to the cross-bars I and J, and extends forward about six feet, and is pivoted to the draft-pole E at *h*, or may be extended the entire length of the draft-pole, thus giving a movement on the arc of a large circle and removing a large portion of the usual friction, and also giving an easy movement.

At the rear end of the movable frame, under the cross-bar H, I place two bevel-rollers, *a*, one of them being shown at Fig. 2, and, if desired, one on the draft-pole, under the cross-bar J, or at any other convenient place at the front end. The rollers are beveled, so that in rolling they will describe a circle having its center at *h*, and, being so constructed, they roll without friction or sliding, as they would do if made with the ends equal in diameter.

The seat G is placed on the rear end of the bar F, which bar is bolted to the draft-pole just forward of the axle, or to it, as may be desired.

This construction makes a very desirable cultivator, as the separate construction of the fixed parts gives the machine sufficient strength to make it durable, and the draft of the team, being directly attached to the fixed parts, removes all obstruction from that source to the movement of the other parts, leaving them under the perfect control of the operator and free from all strain by reason of any inequality in the strength or speed of the horses; and the movable parts, having a separate construction and being pivoted so far forward, can be moved with ease by the operator, and, after being moved in either direction, will of their own motion return to a straight line of draft without being thrown back by the operator, and will follow a straight row without being held in place by the driver or any effort on his part.

Having thus fully described my improved cultivator, what I claim as my invention, and desire to secure by Letters Patent, is—

1. Attaching the shovels to beams having an independent vertical movement, and so connected to the movable frame L H that by moving the latter sidewise all the plows are moved with it, said movable frame being pivoted at *h*, substantially as and for the purpose set forth.

2. Interposing the conical rollers *a* between the fixed and movable frames, to enable the latter to be more easily operated, as shown and described.

JOHN LACEY.

Witnesses:
L. L. BOND,
E. A. WEST.